(12) United States Patent
Mikic et al.

(10) Patent No.: US 11,565,607 B2
(45) Date of Patent: Jan. 31, 2023

(54) HIGH EFFICIENCY HYDROGEN FUELED HIGH ALTITUDE THERMODYNAMIC FUEL CELL SYSTEM AND AIRCRAFT USING SAME

(71) Applicant: Joby Aero, Inc., Santa Cruz, CA (US)

(72) Inventors: Gregor Veble Mikic, Santa Cruz, CA (US); JoeBen Bevirt, Santa Cruz, CA (US); Robert Gulliver Lynn, Auckland (NZ); Alex Stoll, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 17/348,193

(22) Filed: Jun. 15, 2021

(65) Prior Publication Data
US 2022/0009379 A1     Jan. 13, 2022

Related U.S. Application Data

(60) Provisional application No. 63/187,915, filed on May 12, 2021, provisional application No. 63/039,407, filed on Jun. 15, 2020.

(51) Int. Cl.
*H01M 8/04* (2016.01)
*B60L 58/33* (2019.01)
(Continued)

(52) U.S. Cl.
CPC .......... *B60L 58/33* (2019.02); *B64C 29/0016* (2013.01); *B64D 27/24* (2013.01); *H01M 8/04014* (2013.01); *H01M 8/04029* (2013.01); *H01M 8/04164* (2013.01); *H01M 8/04738* (2013.01); *B60L 2200/10* (2013.01); *B64D 2033/024* (2013.01); *B64D 2033/026* (2013.01); *B64D 2033/0266* (2013.01); *H01M 2250/20* (2013.01)

(58) Field of Classification Search
CPC ......... H01M 8/04014; H01M 8/04029; H01M 8/04164
See application file for complete search history.

(56) References Cited

U.S. PATENT DOCUMENTS 5,106,035 A     4/1992  Langford
2002/0005454 A1  1/2002  Maccready et al.
(Continued)

OTHER PUBLICATIONS

PCT Search Report and Written Opinion; dated Sep. 23, 2021; for PCT/US2021/037436.

*Primary Examiner* — Olatunji A Godo
(74) *Attorney, Agent, or Firm* — Michael A. Guth

(57) ABSTRACT

A high efficiency hydrogen fuel system for an aircraft at high altitude which utilizes compressors to compress air to a sufficiently high pressure for the fuel cell. Liquid hydrogen is compressed and then utilized in heat exchangers to cool the compressed air, maintaining the air at a temperature low enough for the fuel cell. The hydrogen is also used to cool the fuel cell as it is also depressurized prior to its entry in the fuel cell cycle. A water condensation system allows for water removal from the airstream to reduce impacts to the atmosphere. The hydrogen fuel system may be used with VTOL aircraft, which may allow them to fly at higher elevations. The hydrogen fuel system may be used with other subsonic and supersonic aircraft, such as with asymmetric wing aircraft.

20 Claims, 10 Drawing Sheets

(51) Int. Cl.
  *B64D 27/24* (2006.01)
  *B64C 29/00* (2006.01)
  *H01M 8/04701* (2016.01)
  *H01M 8/04029* (2016.01)
  *H01M 8/04119* (2016.01)
  *H01M 8/04014* (2016.01)
  *B64D 33/02* (2006.01)

(56) References Cited

U.S. PATENT DOCUMENTS

| | | |
|---|---|---|
| 2004/0028960 A1 | 2/2004 | McElroy et al. |
| 2010/0062301 A1* | 3/2010 | Hendriks ............ H01M 8/249 429/410 |
| 2014/0252156 A1 | 9/2014 | Hiebl et al. |
| 2017/0170494 A1 | 6/2017 | Lents et al. |
| 2019/0300182 A1 | 10/2019 | Knapp et al. |
| 2019/0323426 A1 | 10/2019 | Mackin |
| 2019/0323427 A1 | 10/2019 | Mackin |
| 2020/0003365 A1 | 1/2020 | Kondo et al. |
| 2020/0148347 A1 | 5/2020 | Bevirt et al. |
| 2020/0165012 A1 | 5/2020 | Stamm et al. |
| 2020/0194812 A1 | 6/2020 | Jeon et al. |
| 2020/0200325 A1 | 6/2020 | Frobose et al. |
| 2020/0355117 A1 | 11/2020 | Miftakhov |
| 2021/0070457 A1 | 3/2021 | Wiegman |
| 2021/0078719 A1 | 3/2021 | Thomas et al. |
| 2021/0107674 A1 | 4/2021 | Habersbusch et al. |

\* cited by examiner

HIGH EFFICIENCY HYDROGEN FUELED HIGH ALTITUDE THERMODYNAMIC FUEL CELL SYSTEM AND AIRCRAFT USING SAME

CROSS-REFERENCE TO RELATED APPLICATIONS

This application claims priority to U.S. Provisional Patent Application No. 63/039,407 to Veble Mikic et al., filed Jun. 15, 2020, which is hereby incorporated by reference in its entirety. This application claims priority to U.S. Provisional Patent Application No. 63/187,915 to Veble Mikic et al., filed May 12, 2021, which is hereby incorporated by reference in its entirety.

FIELD OF THE INVENTION

This invention relates to aerial vehicles, namely an aerial vehicle using hydrogen fuel at high altitude.

BACKGROUND

The world is transitioning away from the use of fossil fuels, and is in need of high energy density energy storage to support the transition of long range aviation to renewable energy sources. Air travel at high altitudes allows higher velocities and shorter flight times than possible in the lower atmosphere, while keeping landing and take-off speeds at modest levels that allow operation from a wider range of airports.

Liquid hydrogen can provide a suitable means for storing and transporting energy for use in aviation, it can be manufactured with high efficiency from distributed renewable sources, and, with the highest energy density of all potential aviation fuels, it is likely the best solution for long range flight.

SUMMARY

Figure 1:
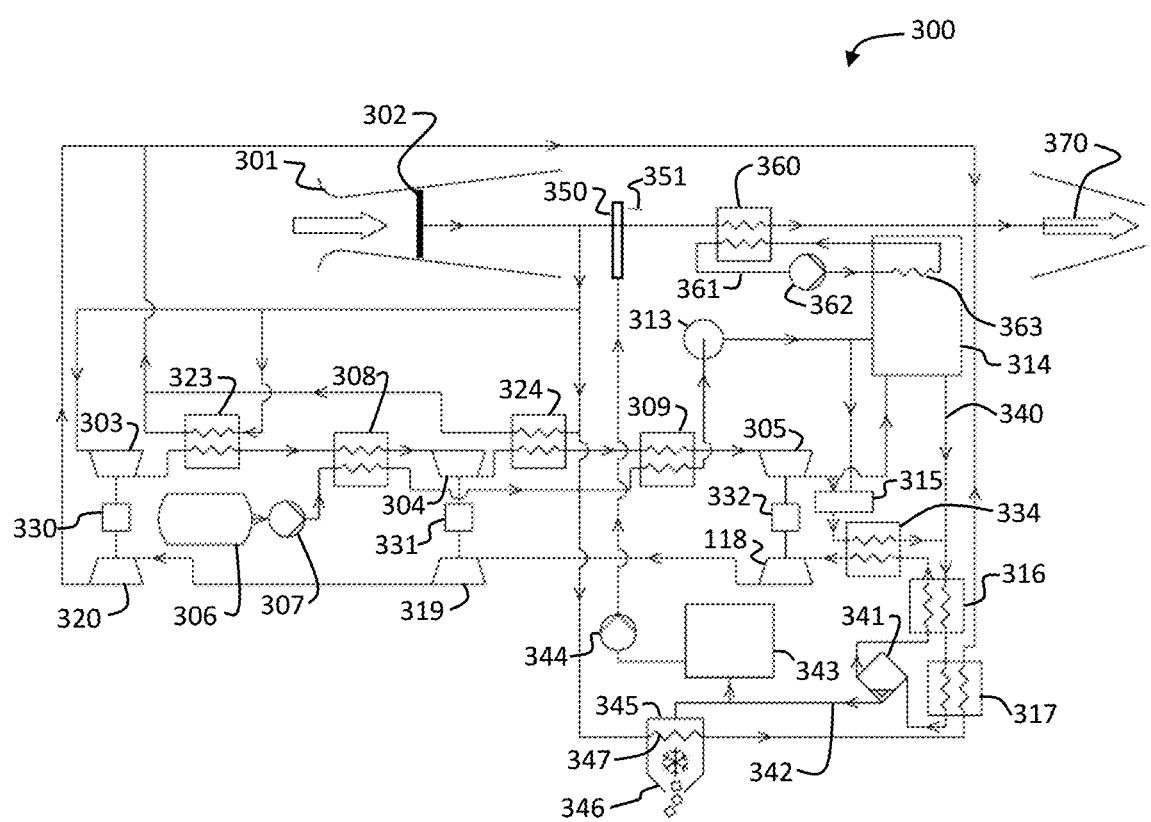
FIG. 1 illustrates a high efficiency hydrogen fuel cell system according to some embodiments of the present invention.

A high efficiency hydrogen fuel system for an aircraft at high altitude which utilizes compressors to compress air to a sufficiently high pressure for the fuel cell. Liquid hydrogen is pumped to higher pressure and then utilized in heat exchangers to cool the air during compression, maintaining the air at a temperature low enough for the fuel cell. The hydrogen is also used to cool the fuel cell as it is also expanded and cooled prior to its entry in the fuel cell cycle. A water condensation system allows for water removal from the airstream to reduce water vapor impacts to the atmosphere. The hydrogen fuel system may be used with VTOL aircraft, which may allow them to fly at higher elevations. The hydrogen fuel system may be used with other subsonic and supersonic aircraft, such as with asymmetric wing aircraft.

DETAILED DESCRIPTION

Among the goals of the current invention is to provide a hydrogen fueled high energy and power density propulsion system suited to propelling aircraft at high altitude over long distances. In the absence of exceptional increases in battery performance high altitude aviation will require the use of high density hydrogen or hydrogen containing fuels that react with atmospheric oxygen to produce water vapor, if this water is exhausted into the upper atmosphere then it will have average residence times that can extend up to years depending upon altitude, meaning that extensive operation of aviation at high altitude could lead to unacceptable accumulation of water vapor in the upper atmosphere. Water vapor is a powerful greenhouse gas, and can have impacts both as a gas and as ice crystals at high altitude and may thus have a significant impact upon climate if there are a lot of flights operating at high altitudes.

Condensation of water vapour into liquid water and ice releases energy that may be utilised to heat air that may usefully contribute to overall propulsive thrust via the Meridith or ram-jet effect wherein inlet air in a fast moving aircraft undergoes compression in the inlet, is then heated and undergoes greater expansion on outlet to produce a higher outlet velocity than the aircraft flight velocity and thereby a net propulsive effect. Condensing water and creating ice may thereby create a useful secondary propulsive boost and higher overall propulsive efficiency.

It is therefore another goal of the current invention to provide a means for reducing the amount of water vapor released into the upper atmosphere by long range, high altitude aviation. Large aircraft currently present the standard solution for long distance passenger flight owing to the advantages afforded by gas turbine propulsion systems that increase in efficiency, durability and power-to-weight as they increase in size. Aerodynamic efficiency also improves with size as the useful volume within the fuselage compared to the surface area of the aircraft increases with size.

Hydrogen has very low density and storing sufficient hydrogen to enable long distance flight requires substantial volumes of fuel to be stored, with correspondingly large heavy cryogenic tanks with significant thermal insulation requirements. These tanks can represent a significant proportion of the entire vehicle volume, leading to increased vehicle drag as the vehicle volume is increased to accommodate passengers and payload, tanks and other systems. This is particularly true in smaller vehicles where increasing internal volume comes with a greater drag price than for larger aircraft. To minimize the volume and mass of hydrogen required, as well as to reduce fuel costs it is desirable to have a high efficiency conversion scheme for converting the hydrogen into propulsive power. This system also needs to operate adequately over a wide range of atmospheric pressures and temperatures encountered from ground level to high altitude.

It is therefore a goal of the current invention to create a liquid hydrogen powered propulsion system suitable for small high speed aircraft operating at high altitude at high power levels with high efficiency and reliability. Liquifying hydrogen requires a lot of energy, but this energy can be partially recovered through the use of an appropriate thermodynamic process that in turn can further improve the energy density of the hydrogen fuel and usefully reduce the necessary tank volume and mass. This process can have a secondary useful effect of providing additional cooling as the energy extracted from the hydrogen gas expanding in a turbine or the like serves to further cool it and means that it can provide additional heat sinking for other components of the propulsive system.

Another goal of the current invention is to optionally integrate a means for creating propulsive power from the pressurization of liquid hydrogen fuel followed by heating of the liquid to convert it to a warm gas so that it may be expanded though one or more stages of turbine (being one or more of a list that includes rotary screw expander, rotary scroll expander, reciprocating piston expander or turbomachinery turbine) optionally with reheating to heat the gas further after each stage of expansion, to thereby provide additional mechanical work to the propulsion system before the hydrogen is used as a fuel and oxidized to release energy in the propulsion system. The heating of the hydrogen can preferably provide useful cooling to elements of the propulsion system or other elements of the aircraft.

Proton Exchanger Membrane Fuel Cells (PEMFC) have a lot of advantages for aviation applications. They have high efficiencies and high power to weight ratios, but have disadvantages in that they need to be kept cool, typically in the range of 70–80° C., and require substantial cooling to dissipate the heat from typically 40-60% of the hydrogen oxidation energy that is not converted into electricity. Additionally, they need to be supplied with reactants at elevated pressure. Achieving this in a manner that maintains the advantages of high power to weight and high efficiency even while operating in the low ambient pressures found at high altitude and particularly in small sizes presents many challenges. Another goal of the current invention is to provide a fuel cell system that may maintain the fuel cell within its optimal operating temperature range with near optimal pressurization of air and hydrogen supplied to the fuel cell through the full range of operating altitudes, ambient air pressures and temperatures, while minimizing the drag incurred by the fuel cell propulsion system.

Preferably the air ingested for the purpose of operating and cooling the fuel cell is exhausted from the aircraft with a rearwards velocity approximately the same as the other propulsive actuators, such as propellers fans and the like, so as to optimally contribute to the overall driving thrust of the aircraft without wasting energy. Preferably the air provided to the fuel cell for cooling and to provide oxygen to react in the fuel cell will be accelerated by the action of a mechanically driven fan or the like so that it will exit the vehicle at a velocity similar to the air exiting other propulsive elements of the plane. In some aspects, the ingested air may be driven with a propeller or fan in order to speed up/raise the pressure of the inletted air to the system. In some aspects, the ingested air may be driven at such a high speed (or high pressure) that the outletted air from the air passage system is used as a propulsion source for the aircraft FIG. 1 illustrates a high efficiency hydrogen fueled high altitude thermodynamic fuel cell system 300 according to some embodiments of the present invention. In some aspects, the system 300 is adapted to deliver electricity to power an electrically powered aircraft, which may then use the electricity to power electric motors. In some aspects, the electrically powered aircraft may be a vertical take-off and landing aircraft. In some aspects, the aircraft may be an asymmetric wing aircraft. In other aspects, other aircraft configurations may utilize the high efficiency hydrogen fueled thermodynamic fuel cell system 300. In some aspects, the system 300 additionally provides thrust as part of the air outletting from the system.

The hydrogen fueled thermodynamic fuel cell system may include a series of intertwined pathways, such as one or more pathways for intake air, a pathway for hydrogen, a pathway for byproducts from the fuel cell, and a pathway for water condensed out from the byproducts from the fuel cell.

Figure 2:
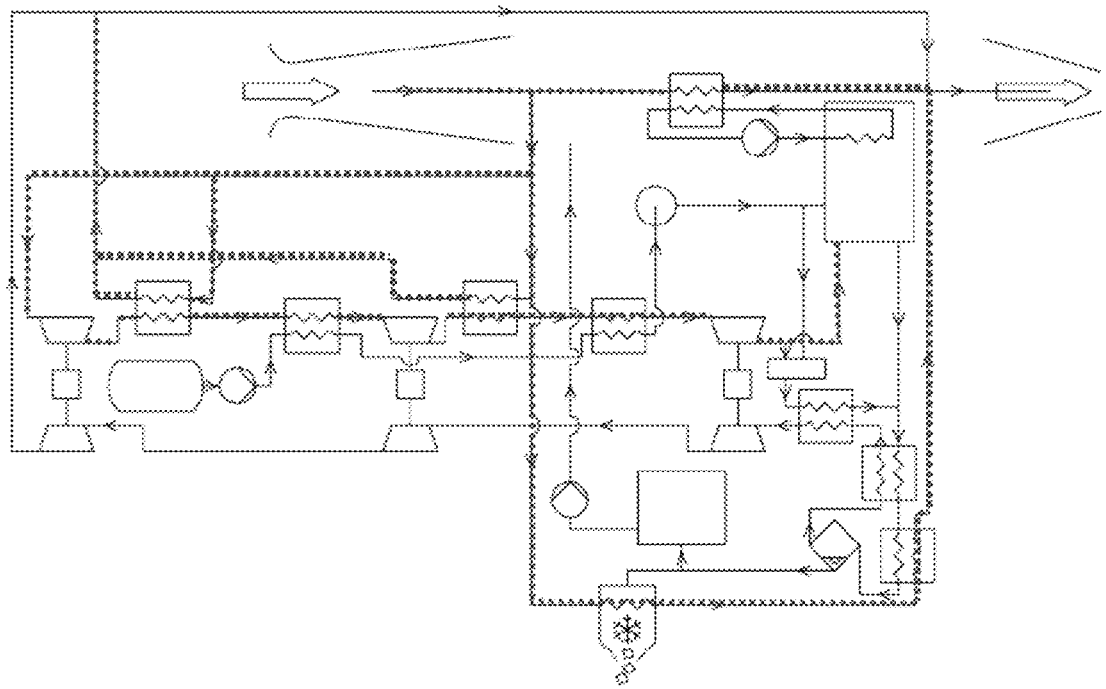
FIG. 2 illustrates the airflow through a high efficiency hydrogen fuel cell system according to some embodiments of the present invention.

An air inlet 301 allows for air entry into the hydrogen fueled thermodynamic fuel cell system. In some aspects, the fuel cell system provides electric power for electric motor driven propellers, which may be part of a VTOL aircraft. In some such systems, intake air may be routed through intake vents at various locations on the aircraft. In the case of a VTOL aircraft, for example, the intake vents may route the intake air through an intake fan 302 as part of the intake air routing. In some aspects, such as with a fan tube as described below, the inletted air may be air entering the fan tube, and the intake fan 302 may also be the thrust fan. In some aspects, the fuel cell system provides electric power for an electric motor driven fan system, and in some such systems the intake air may be routed in from within the fan tube. In some aspects, an inlet fan 302 is used to accelerate air into the air inlet 301. The air pathway is seen highlighted separately in FIG. 2. As the system may be used at very high altitudes where pressures are low, the air traveling through the system may be compressed through a series of compressors 303, 304, 305 which may compress the air up to 30 times higher than the inlet pressure, for example. After compression in a first compressor 303, the compressed air may be cooled first in an air to air first intercooler 323 where it is cooled with inletted air not routed to the first compressor 303. The compressed air is then further cooled by the liquid hydrogen flow at a second intercooler 308. The cooled air is then sent to a second compressor 304, and afterwards again is routed through a third intercooler 324, where it is again cooled with inletted air, and a fourth hydrogen intercooler 309, where it is again cooled further by the hydrogen flow. The cooled air is then sent to a third compressor 305, after which it is routed to the fuel cell portion 322. A portion of this compressed inlet air may be routed to a burner 315. Using the cooling methods described above, the airflow was able to be compressed to a pressure high enough as needed for the fuel cell, while also able to be delivered at a temperature low enough as need for the fuel cell. In some aspects, there may be bypass systems which allow one or more of the compressors 303, 304, 305 to be bypassed such as when the ambient pressure is higher at lower altitudes to enable efficient operation throughout the full range of flight altitudes.

Inletted air, which may be very cold, is also routed to intercoolers, in addition to its separate routing to the compressors described above. The inlet air may be routed to a heat exchanger 347 in an ice maker 345 to assist in the freezing of water condensed from the fuel cell exhaust. This air path may then continue a seventh intercooler 317 where it cools the fuel cell exhaust, after which it may route to the system air outlet flow 370. The inletted air may also route to the third intercooler 324 to cool compressed air coming from the second compressor 304.

Figure 3:
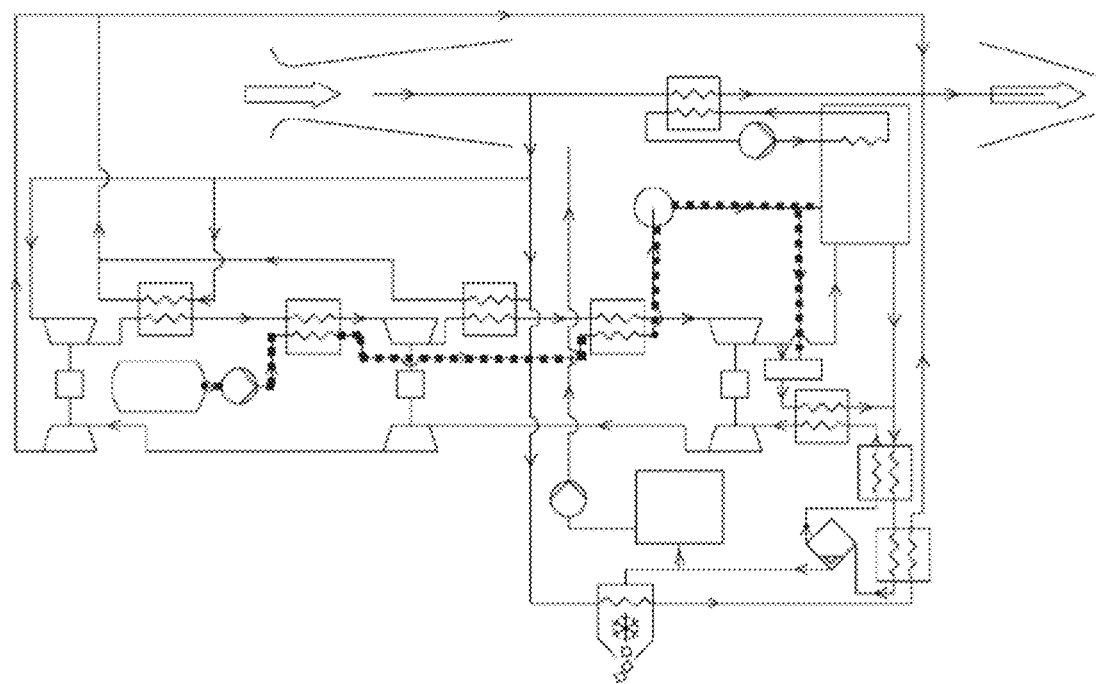
FIG. 3 illustrates the hydrogen flow through a high efficiency hydrogen fuel cell system according to some embodiments of the present invention.

Liquid hydrogen may be stored in a liquid hydrogen tank 306 and is routed to a liquid hydrogen pump 307 where it is elevated in pressure. The hydrogen pathway is seen highlighted separately in FIG. 3. The liquid hydrogen may be routed through the second intercooler 308 where it helps cool compressed air as it evaporates. The hydrogen is then routed through the fourth intercooler 309 where it similarly helps cool compressed air that is further down the air pathway. The hydrogen may then be expanded at a first expander to extract useful mechanical power and usefully cool the hydrogen, and then routed to the fuel cell. In some aspects, the hydrogen may be expanded at a first expander 313 and then routed to the fuel cell 314. In some aspects, the hydrogen may be expanded at a first expander, rerouted as cooling flow through the fuel cell, expanded further at a second expander, and then routed to the fuel cell.

A portion of the hydrogen flow may be routed to a burner 315, which may provide heat in an exchanger that may flow to a series of turbochargers 318, 319, 320, which may be used to assist in powering the compressors 303, 304, 305, which may be primarily powered by electric motors 330, 331, 332.

Figure 4A:
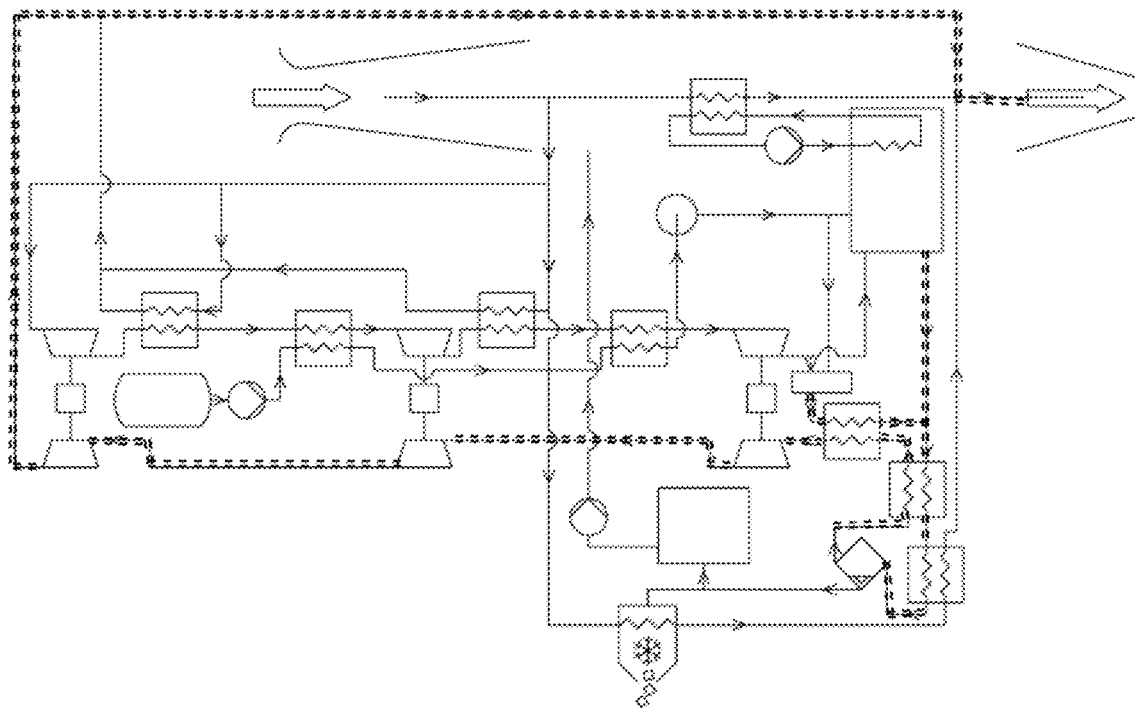
FIG. 4A illustrates the exhaust flow through a high efficiency hydrogen fuel cell system according to some embodiments of the present invention.
Figure 4B:
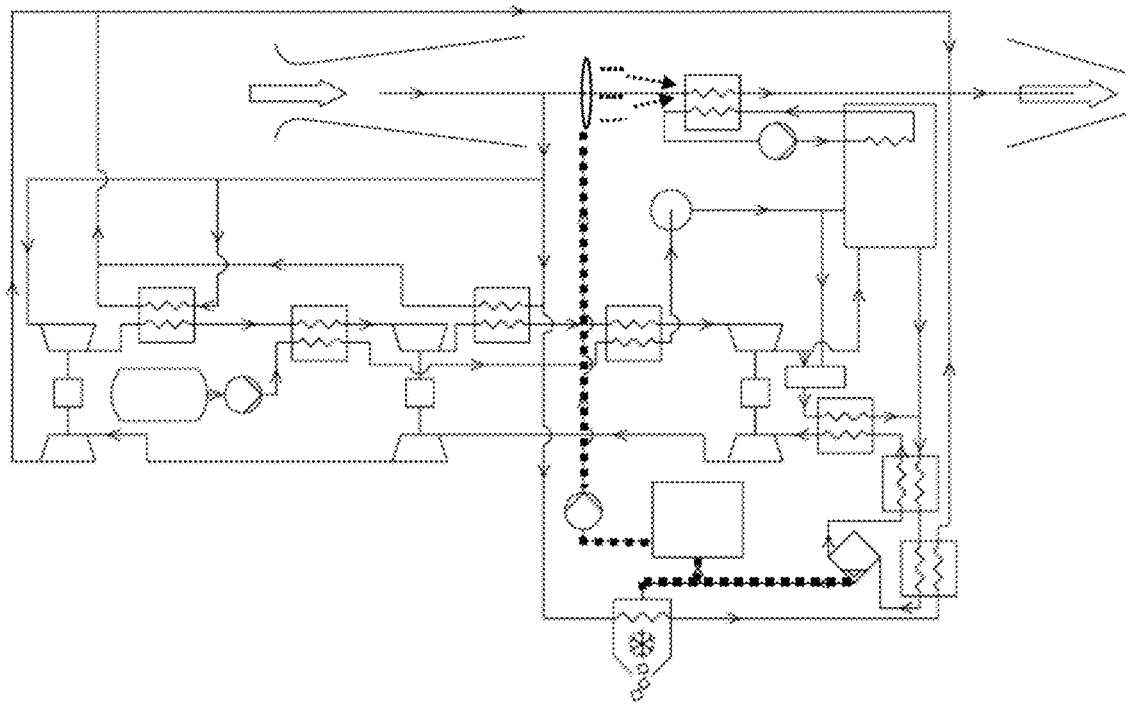
FIG. 4B illustrates the water flow through a high efficiency hydrogen fuel cell system according to some embodiments of the present invention.
Figure 5:
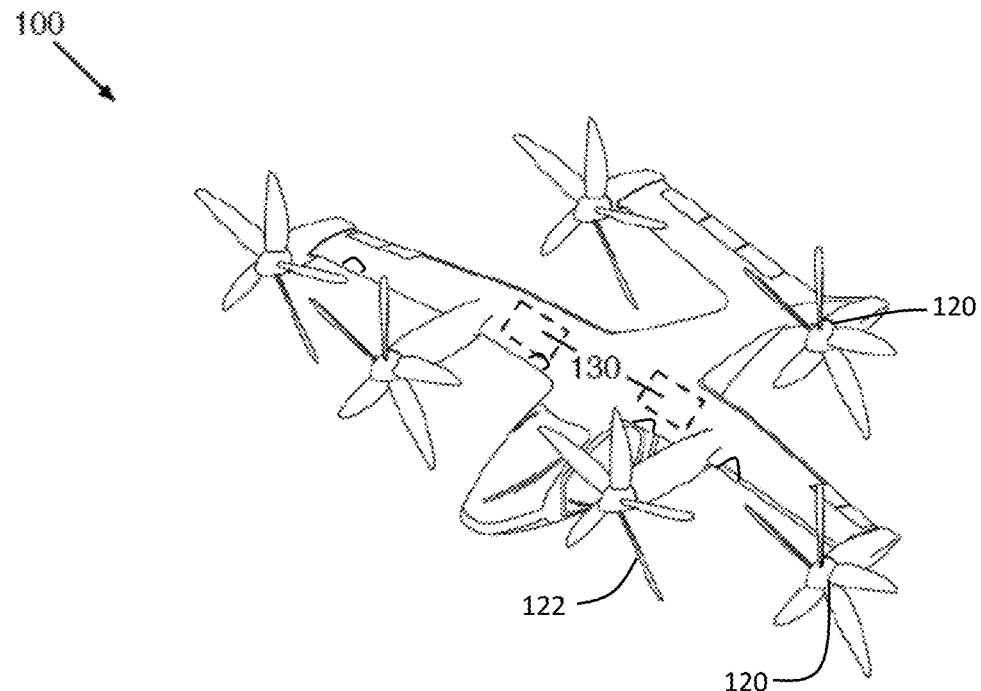
FIG. 5 is a front oblique view of a vertical take-off and landing aircraft in a forward flight configuration according to some embodiments of the present invention.
Figure 6:
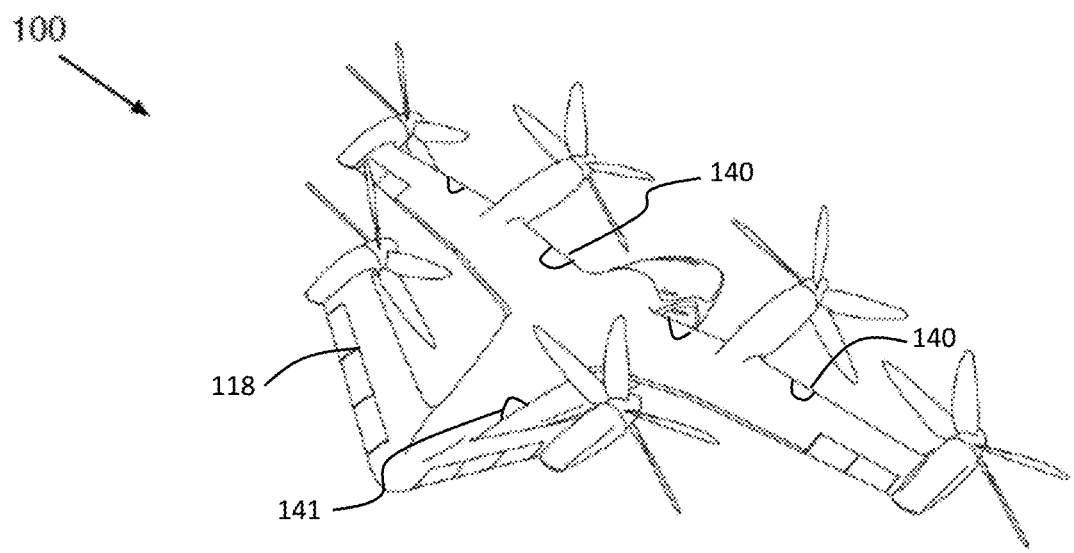
FIG. 6 is a rear oblique view of a vertical take-off and landing aircraft in a forward flight configuration according to some embodiments of the present invention.
Figure 7:
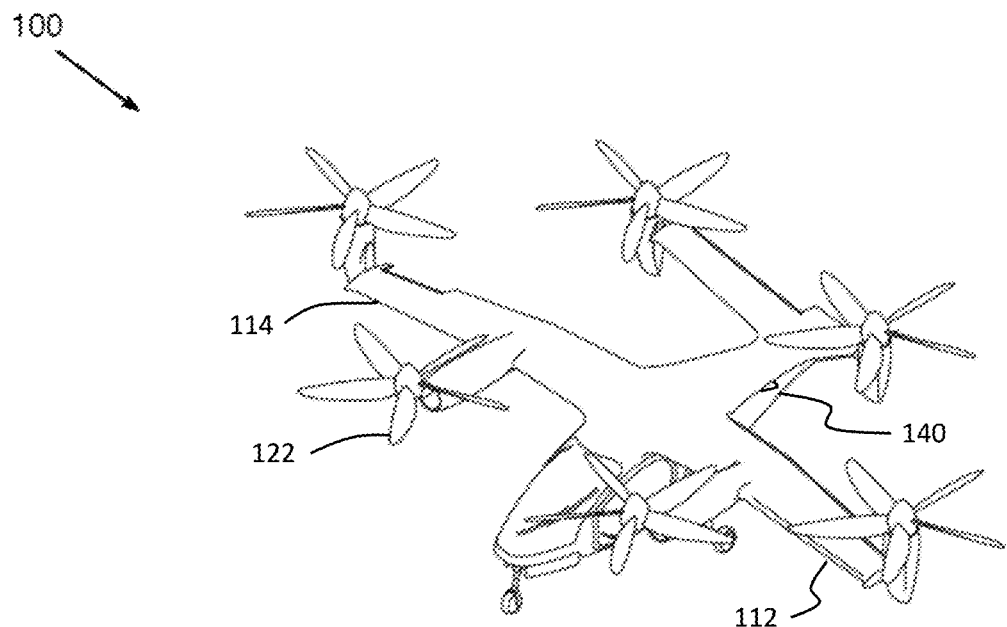
FIG. 7 is a front oblique view of a vertical take-off and landing aircraft in a vertical flight configuration according to some embodiments of the present invention.
Figure 8:
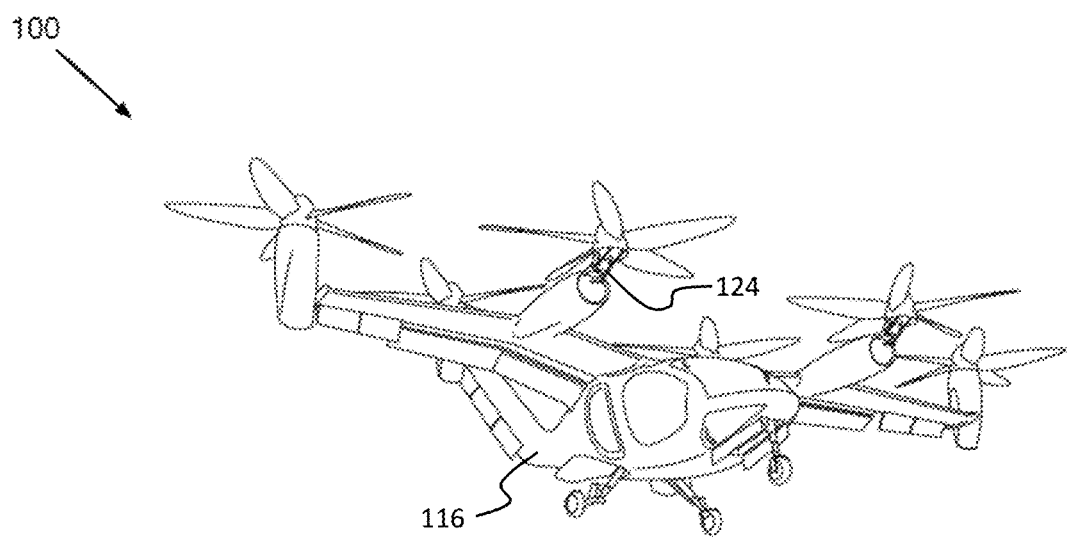
FIG. 8 is a rear oblique view of a vertical take-off and landing aircraft in a vertical flight configuration according to some embodiments of the present invention.

The exhaust 340 from the fuel cell 314 follows an exhaust flow path which is shown with more clarity highlighted in FIG. 4A. In some aspects, the exhaust from the fuel cell consists predominantly of partially oxygen depleted air and water vapor. The exhaust 340 routes to a sixth intercooler 316 and then a seventh intercooler 317. Water in the exhaust in condensed out during this cooling and is separated out at a trap 341. Some of the water flow 342 may be routed to a water reservoir 343, while some water may instead be sent to an ice making unit 345. Water flow is illustrated in FIG. 4B. The ice making unit 345 may be cooled by the very cold air inletted at high altitude, with the ice made then expelled from the aircraft. After leaving the trap 341, the air flow may go to an eighth intercooler 334 wherein it is heated by exhaust from the burner 315. As mentioned above, expelling the water as ice allows for the ice to descend to lower altitudes before the ice melts and adds water vapor to the atmosphere. In some aspects, water in the water reservoir 343 may also be routed to a water pump 344 which then routes to a water spray unit 350, which expels water 351 into the air flow path prior to an eight intercooler 360 adapted to cool the fuel cell. The water spray 351 accentuates the cooling rate of the eighth intercooler 360, which may be thermally coupled to a closed loop cooling system 361 adapted to cool the fuel cell with a thermal interchange portion 363. The closed loop cooling system 361 may include a pump 362 and an appropriate coolant. As mentioned above, water may be condensed out of the flow from the fuel cell system at an exhaust water condenser 341, which may then allow the condensed water to be frozen and ejected from the aircraft as solid ice. This may allow the ice to descend to a lower altitude before melting, thus not contributing water vapor to the highest flight areas of the aircraft. If liquid water is exhausted into the upper atmosphere, then it may have average residence times that can extend up to years depending upon altitude, meaning that extensive operation of aviation at high altitude could lead to unacceptable accumulation of water vapor in the upper atmosphere. Water vapor is a powerful greenhouse gas, and can have impacts both as a gas and as ice crystals at high altitude and may thus have a significant impact upon climate if there are a lot of flights operating at high altitudes. The implementation of this ice ejection system may significantly reduce or eliminate this impact.

The use of a Rankine cycle, pumping liquid hydrogen to high pressure before heating, and using available heat sources and expanding through mechanical turbines to recover extra energy from the liquid hydrogen prior to consumption by the fuel cell provides improvements over any previous systems. Condensing water from the exhaust of the propulsion system provides another advantage in that the heat transferred into cooling air may produce a useful propulsive thrust benefit via the Meredith or ram-jet effect transferring otherwise significant wasted heat energy into useful propulsive force. Also, the operation of the fuel cell at elevated pressures preferably above 2 bar absolute where a larger portion of the output water will be in water form at the operating temperature of the fuel cell. Another improvement is to utilize a recuperative counter-flow heat exchange system wherein much of the heat sinking required to cool the fuel cell exhaust down and condense the water vapor is provided by the exhaust, with water removed, being heated back up to near the fuel cell operating temperature, with supplementary cooling to condense the water vapor coming from some combination of additional inletted cooling air that is not used to react with the hydrogen in the fuel cell, or hydrogen that is afterwards used to power the propulsion system.

In an exemplary embodiment, the aircraft is flying at an altitude of 15 km at 75 m/s, with the air at a temperature of 217 K, and a pressure of 7.6 kPa. The inlet air passes through an intake fan and is at 9.2 kPa and 232 K. Some of this air at this condition may be bypass routed to the first and third intercoolers, but the inlet air proceeds at to a first compressor where it exits at 32.3 kPa and 354 K. That air then enters the first intercooler where it is cooled with the inlet air routed through the bypass to the first intercooler. That inlet air exits the first intercooler at 32.3 kPa and 252 K. This air then enters the second intercooler where it warms the liquid hydrogen, and this air exits the second intercooler at 231 K and 32.3 kPa, where it enters a second compressor. The air exits the second compressor at 352 K and 107 kPa, where it enters a third intercooler where it exchanges heat with the original inlet air. It exits this third intercooler at 252 K and 107 kPa and proceeds to the fourth intercooler where it exchanges heat with the hydrogen. The air exits the fourth intercooler at 231 K and 107 kPa, and then enters a third compressor. It exits the third compressor at 290 K and 0.2 MPa, and is now in a condition to enter the fuel cell, with a portion that may routed to a burner. On its routing to the fuel cell, it has twice warmed the hydrogen, and twice been cooled by the bypassed original cold inlet air.

In this same exemplary embodiment, the hydrogen is stored as a liquid in a fuel tank at 20 K and at 0.1 MPa. The liquid hydrogen is first routed to a compressor at 5 g/s where it exits at 21 K and 2 MPa. The hydrogen then enters the second intercooler where it exits at 125 K and 2 MPa. The hydrogen then enters the fourth intercooler where it exits at 230 K and 2 MPa. The hydrogen then enters one or more expanders to realize a temperature of 142 K and a pressure of 0.2 MPa. The fuel cell is a PEMFC with an efficiency of 54% and generates 300 kW.

In this exemplary embodiment, the exhaust from the fuel cell is routed through a fifth, sixth, and seventh intercooler. The fuel cell exhaust may exit the fuel cell at 353 K, and then route through the sixth and then the seventh intercooler, where it exits at 274 K and 0.2 MPa. It then enters the water separator, where water may then be routed to the ice maker which is coupled to inlet air flow at 232 K. The dried exhaust then proceeds to the sixth intercooler (recuperative condenser) and is then heated in the fifth intercooler with heat from the burner, where it exits at 553 K and 0.2 MPa. This heated air can then be used to help power the air compressors, going to 487 K and 118.2 kPa after routing through the first sequential turbine, 350 K and 35.1 kPa after the second turbine, and 211 K and 10.4 kPa after the final turbine, where it is then routed out to the exhaust.

A vertical take-off and landing (VTOL) aircraft presents unusual circumstances when powered by a liquid hydrogen high efficiency thermodynamic fuel system according to embodiments of the present invention. A VTOL aircraft may have its highest power load during hover, take-off, and landing. The need for higher thrust during these operations may present the limiting case for the design of the power system, including the thermal management system. Although these operations typically occur at low altitude where the air is denser (thus not requiring as much inlet air compression, for example), they do occur where the air temperature may be much higher than would be seen at high altitude operation In order to avoid designing and sizing a cooling system around an operational mode which may, typically, last under a minute, a water assisted cooling mode may be added for use during hover, take-off, and landing, and as otherwise needed.

With the use of the water reservoir 343, water can be sprayed 351 from a water spray unit 350 in the air flow upstream of an intercooler adapted for cooling the fuel cell. The water spray unit may also be downstream in the air flow from the routing of the inletted air into compression system leading to input into the fuel cell. In this way, a VTOL aircraft can have this extra, auxiliary, cooling for the VTOL operations and avoid the need for having a thermal system oversized for ordinary flight modes. Although water may be condensed from the exhaust flow from the fuel cell, as described herein, a water tank may be used to allow for the use of water cooling during initial flight operations, such as take-off, in advance of the collection of water from the fuel cell exhaust during flight. An example of such a VTOL aircraft is discussed below.

As shown in FIGS. 5-8, the tiltrotor aircraft 100 includes an airframe and a plurality of propulsion assemblies coupled to the airframe. The aircraft 100 is operable between a hover mode, wherein the plurality of propulsion assemblies 120 is arranged in a hover arrangement, and a forward mode, wherein the plurality of propulsion assemblies is arranged in a forward arrangement. The hover arrangement defines the position of each propeller 122 of the plurality of propulsion assemblies relative to each other propeller of the plurality of propulsion assemblies and the airframe during aircraft operation in the hover mode, and the forward arrangement likewise defines the relative position of each propeller to each other propeller and the airframe during operation in the forward mode. The airframe can include a left wing, a right wing, a fuselage, and an empennage, wherein the left and right wings are coupled to the fuselage 116 and positioned between forward of the empennage 118. Each propulsion assembly includes a propeller, a tilt mechanism, and an electric motor. Each propulsion assembly is operable, preferably by the tilt mechanism 124 associated therewith but alternatively in any other suitable manner, between a hover configuration and a forward configuration as described in further detail below. The tiltrotor aircraft can additionally include an electric power source, flight control surfaces and actuators, and any other suitable components.

The tiltrotor aircraft 100 functions to provide an aerial vehicle operable between a hover mode (e.g., rotary-wing mode) and a forward mode (e.g., fixed-wing mode). The hover mode can include vertical takeoff, vertical landing, and/or substantially stationary hovering of the aircraft 100; however, the hover mode can additionally or alternatively include any suitable operating mode wherein vertically-directed thrust is generated by one or more of the plurality of propulsion assemblies. The forward mode can include forward flight, horizontal takeoff, and/or horizontal landing of the aircraft 100 (e.g., conventional take-off and landing/CTOL); however, the forward mode can additionally or alternatively include any suitable operating mode wherein horizontally-directed thrust is generated by one or more of the plurality of propulsion assemblies. Thus, the hover mode and forward mode are not mutually exclusive, and the tiltrotor aircraft 100 can operate in a superposition of the hover mode and the forward mode (e.g., wherein the plurality of propulsion assemblies 120 is arranged in a superposition of the hover arrangement and the forward arrangement defined by a liminal configuration of each of the plurality of propulsion assemblies between the hover configuration and the forward configuration). The tiltrotor aircraft 100 can also function to provide an aerial vehicle that is stable in hover mode (e.g., maximally stable, stable within a defined stability window or envelope of flight conditions, stable up to a stability threshold magnitude of various control inputs to the aircraft 100, etc.) and efficient (e.g., aerodynamically efficient, power efficient, thermodynamically efficient, etc.) in forward mode. The tiltrotor aircraft 100 can also function to provide airborne transportation to passengers and/or cargo. However, the tiltrotor aircraft 100 can additionally or alternatively have any other suitable function.

The tiltrotor aircraft 100 is operable between a plurality of modes, including a hover mode and a forward mode. In the hover mode, the plurality of propulsion assemblies can be arranged in the hover arrangement. In the hover arrangement, each of the plurality of propellers is preferably arranged in the hover configuration. In the forward mode, the plurality of propulsion assemblies can be arranged in the forward arrangement. In the forward arrangement, each of the plurality of propellers is preferably arranged in the forward configuration. However, each of the plurality of propellers can be arranged in any suitable state between the forward and hover configurations, independently of one another, and/or in any suitable orientation in the hover mode of aircraft 100 operation; furthermore, each of the plurality of propellers can be arranged in any suitable state between the forward and hover configurations, independently of one another, and/or in any other suitable orientation in the forward mode of aircraft 100 operation. Furthermore, the tiltrotor aircraft 100 can be operated in any suitable liminal mode between the hover mode and forward mode, wherein a component of thrust generated by one or more propulsion assemblies 120 is directed along both the vertical axis and the longitudinal axis (e.g., and/or the lateral axis).

Though the aircraft 100 is referred to herein as a tiltrotor aircraft 100, the terms "propeller" and "rotor" as utilized herein can refer to any suitable rotary aerodynamic actuator, commonly referred to as a rotor, a propeller, a rotating wing, a rotary airfoil, and the like. While a rotor can refer to a rotary aerodynamic actuator that makes use of an articulated or semi-rigid hub (e.g., wherein the connection of the blades to the hub can be articulated, flexible, rigid, and/or otherwise connected), and a propeller 122 can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of propeller can refer to either configuration, and any other possible configuration of articulated or rigid blades, and/or any other possible configuration of blade connections to a central member or hub. Accordingly, the tiltrotor aircraft 100 can be referred to as a tilt-propeller aircraft 100, a tilt-prop aircraft 100, and/or otherwise suitably referred to or described. In the context of an electric motor, which in some variations can include a stator and rotor, the rotor of the electric motor 126 can refer to the portion of the motor that rotates as electrical potential energy is converted to rotational kinetic energy in operation of the electric motor.

The tiltrotor aircraft 100 includes a plurality of propulsion assemblies coupled to the airframe at a corresponding plurality of propulsion assembly attachment points. Each propulsion assembly preferably includes include a propeller, a tilt mechanism, and an electric motor. The propulsion assembly functions to house and collocate the propeller, the tilt mechanism, the electric motor, and any other suitable components related to the propeller and electromechanical drive thereof. The tiltrotor aircraft 100 preferably includes an even number of propulsion assemblies, and more preferably includes six propulsion assemblies; however, the tiltrotor aircraft 100 can additionally or alternatively include an odd number of propulsion assemblies, eight propulsion assemblies, and any other suitable number of propulsion assemblies 120

The propeller 122 of the propulsion assembly 120 functions to convert rotational kinetic energy supplied by the electric motor 126 to aerodynamic forces (e.g., for propelling the aircraft 100 in the hover mode, the forward mode, etc.). The propeller 122 can include a number of propeller 122 blades (e.g., blades, airfoils, etc.), a head (e.g., a hub and associated linkages), and any other suitable components. The propeller 122 is preferably a variable-pitch propeller 122 (e.g., wherein the pitch of each propeller 122 blade is variable in coordination such as via collective control, wherein the pitch of each propeller 122 blade is independently variable such as via cyclic control, etc.), but can additionally or alternatively be a fixed-pitch propeller. In some variations, the aircraft 100 can include both variable-pitch and fixed-pitch propeller 122 associated with different propulsion assemblies 120 of the plurality of propulsion assemblies 120. In additional or alternative variations, the propeller 122 can be articulated into a negative angle of attack condition, which can function to produce reverse thrust without changing the direction of rotation of the propeller. The propeller 122 preferably includes five blades per propeller, but can additionally or alternatively include any suitable number of blades per propeller 122 (e.g., two, three, four, six, etc.). The propeller 122 can define any suitable disc area (e.g., propeller disc, disc, etc.), and each blade can define any suitable cross section and/or twist angle as a function of blade span.

In a specific example, each propeller of the plurality of propulsion assemblies 120 includes a set of propeller blades attached to the hub by a variable pitch linkage that rotates each propeller blade about a long axis of the propeller blade and constrains propeller blade motion normal to the disc plane (e.g., the propeller blade does not substantially articulate forward or backward from the disc plane).

The electric power source 130 functions to power the propulsion assembly and any other electrically-powered components of the aircraft coupled thereto (e.g., motorized linkages, flight control surface actuators, and any other electrical actuators, sensors, transducers, displays, etc.). The electric power source may include one or more batteries, but can additionally or alternatively include an electrical generator (e.g., a combustion-driven generator, a fuel cell, a photovoltaic generator, etc.). In variations including a fuel cell, air inlets 140 may be located at various locations around the aircraft, such as on the leading edges of the wings. The air inlets 140 provide inlet air for the thermodynamic fuel system described above. As seen in FIG. 1, downstream from the inlet the may be a fan 102 which increases the pressure of the airflow. As described above, some of this inletted air enters a multi-stage compressor system and is delivered to the fuel cell. As also described above, some of this inletted air provides fuel cell cooling at an eighth intercooler 360. In the case of this VTOL aircraft, extra cooling may be needed during VTOL operations. A water spray unit 350 may provide water 351 into the airflow upstream of the eight intercooler 360. Exhaust outlets 141 for the fuel cell system and for the inletted cooling air may be located at appropriate locations along the wings or on the aircraft body. The tiltrotor aircraft 100 can include a power distribution system that couples the electric power source 130 to each electrically-powered component (e.g., including each electric motor). The power distribution system can include an electrical power transmission bus that distributes power from a plurality of electric power sources to components of the aircraft 100 requiring electrical power. Each propulsion assembly 120 is preferably connected to at least one associated electric power source 130 that powers the electric motor assembly of the propulsion assembly. However, the electric power sources can additionally or alternatively be interconnected to one another and/or to one or more propulsion assemblies 120 such that any propulsion assembly 120 (or other powered component) can draw electrical power from any suitable subset of electric power sources of the aircraft 100, with any suitable relative power draw between electric power sources.

Figure 9:
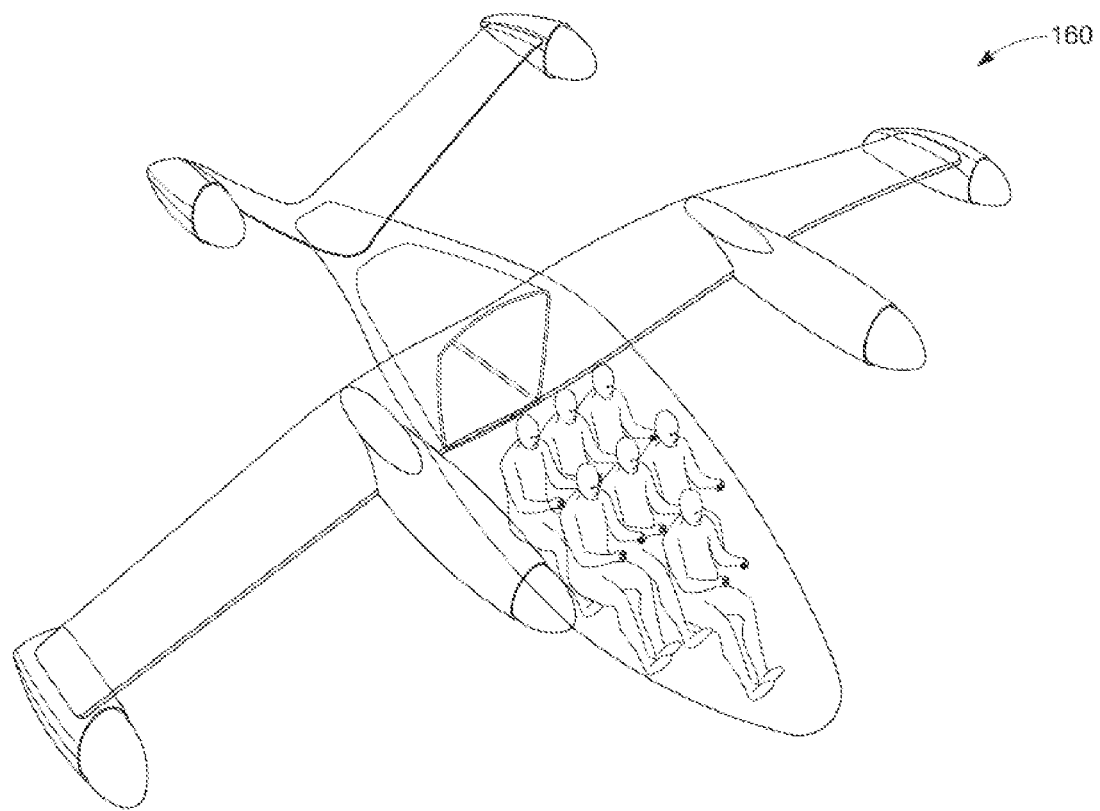
FIG. 9 is a front oblique view of a vertical take-off and landing aircraft according to some embodiments of the present invention.

In some embodiments of the present invention, as seen in FIG. 9, another VTOL aircraft 160 is adapted for flight with a pilot and six passengers, for example. The VTOL aircraft 160 is adapted for flight over 40,000 feet altitude with a cruising speed of 340 knots. The VTOL aircraft 160 uses a high efficiency hydrogen powered fuel cell system as described above.

Figure 12:
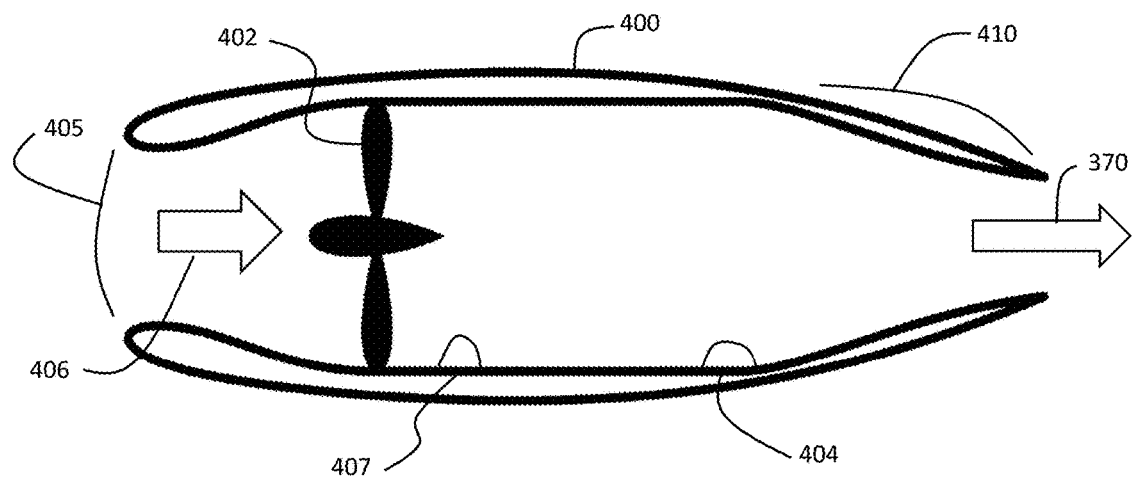
FIG. 12 illustrates a nacelle with a high efficiency hydrogen fuel cell system with leading fan according to some embodiments of the present invention.
Figure 13:
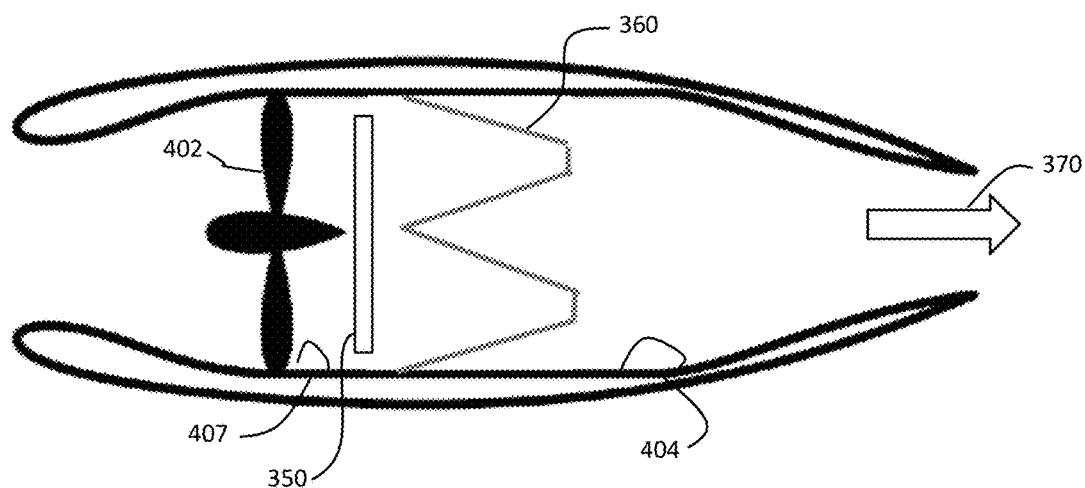
FIG. 13 illustrates a nacelle with a high efficiency hydrogen fuel cell system with leading fan according to some embodiments of the present invention.
Figure 14:
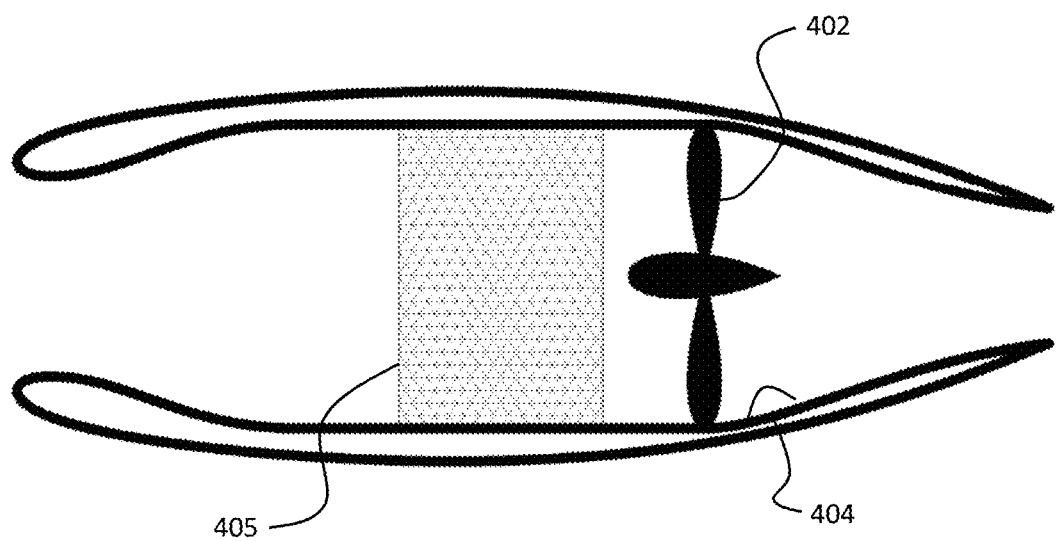
FIG. 14 illustrates a nacelle with a high efficiency hydrogen fuel cell system with trailing fan according to some embodiments of the present invention.

In other embodiments of the present invention, the high efficiency hydrogen fueled thermodynamic fuel cell system may be utilized with a fan tube propulsion system. A cross-sectional view of such a fan tube propulsion system is seen in FIGS. 12-14 and discussed further below. The fan tube propulsion system is seen in an exemplary embodiment of the thrust units 114, 116, 118 in FIG. 10, seen in support of an asymmetric wing aircraft adapted for high speeds and high altitudes.

Figure 10:
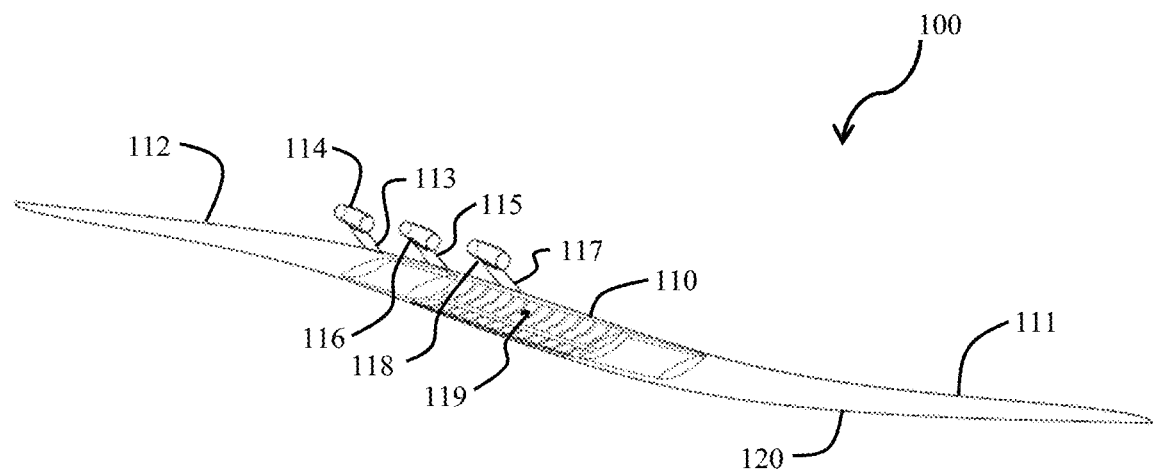
FIG. 10 is a front oblique view of an asymmetric wing aircraft according to some embodiments of the present invention.
Figure 11:
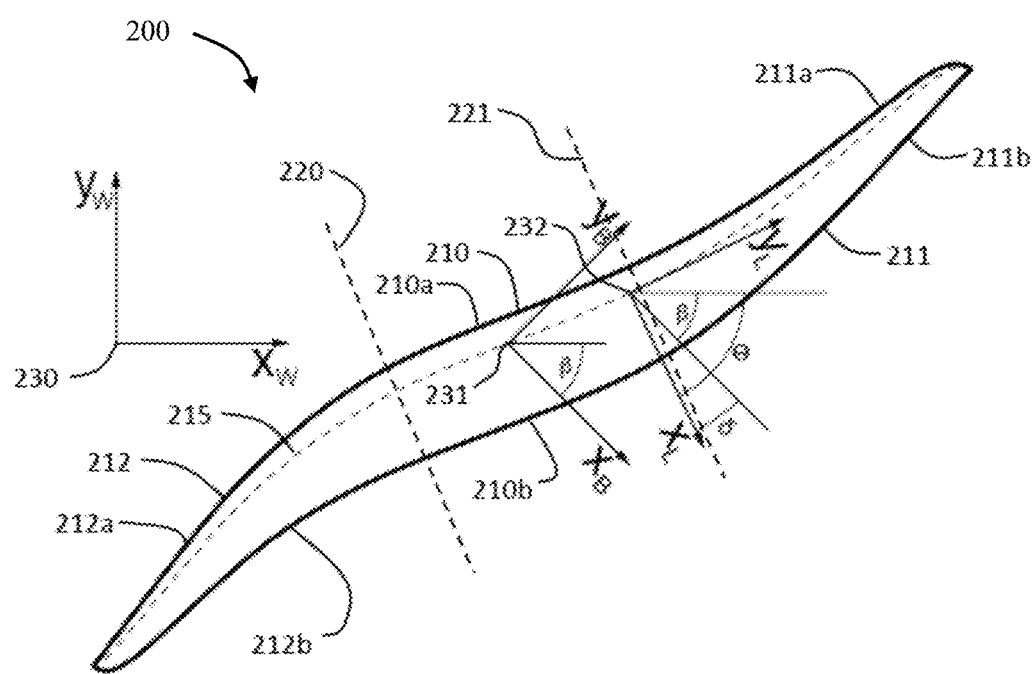
FIG. 11 is view of an asymmetric wing aircraft according to some embodiments of the present invention.

In some embodiments of the present invention, as seen in FIGS. 10 and 11, a multi-segment oblique wing aircraft 110 includes a center segment 210, a left wing segment 211, and a right wing segment 212. The center segment 110 is substantially thicker in the Zb direction (as defined below), and is thick enough to allow for passengers in a passenger area 119. A plurality of thrust units 114, 116, 118 may use pivoting pylons 113, 115, 117 which allow for thrusting in different forward flight configurations. The rotation of the thruster units will change the sweep of the oblique wing aircraft, both due to the change in thrust direction and also due to a rudder effect of the pylons. There may be further trimming and control surfaces and devices which assist in the sweep change.

In some embodiments of the present invention, as seen in FIG. 11, a multi-segment oblique wing aircraft 200 includes a center segment 210, a left wing segment 212, and a right wing segment 211. The center segment 210 has a leading edge 210a and a trailing edge 210b. Although there may be variations along their lengths, the leading edge 210a and the trailing edge 210b of the center segment 210 are substantially parallel. The center segment 210 may be substantially thicker than the other segments and may be adapted to contain pilots and passengers of the aircraft. Although illustrated without propulsion units shown, it is understood the multi-segment oblique wing aircraft 200 may be powered similarly to the aircraft 100 discussed above.

The left wing segment 212 has a leading edge 212a and a trailing edge 212b. The left wing segment 212 tapers as it routes outboard from the center segment 210, in that the chord length lessens along the span of the wing segment. The left wing segment 212 may be substantially thinner in the vertical direction Zb than the center segment 210. The right wing segment 211 has a leading edge 211a and a trailing edge 211b. The right wing segment 211 tapers as it routes outboard from the center segment 210, in that the chord length lessens along the span of the wing segment. The right wing segment 211 may be substantially thinner in the vertical direction Zb than the center segment 210.

FIG. 11 introduces coordinate systems which illustrate aspects of the system. A prevailing wind coordinate system 230 includes the prevalent airflow across the wing as a composite of Xw and Yw, with Xw being the airflow direction seen in forward flight directly into the wind. A body coordinate system 231 is set to remain constant with the body of the wing, with the Yb axis set approximately parallel to the composite average direction of the leading edges 212a, 211a of the wings. The Zb axis of the body coordinate system comes out of the view towards the viewer. A quarter chord coordinate system 232 sets Y1 as parallel to the quarter chord tangent at that point, and X1 as perpendicular to the quarter chord at that point. The body coordinate system 231 remains fixed with regard to the aircraft. The prevailing wind coordinate system 230 is a product of the environment and is independent of the wing, and the quarter chord coordinate system 232 a function of the wing design but alters relative to which point on the wing is being referenced.

The multi-segment wing may be viewed as having a transition from the left wing segment 212 to the center segment 210 at a reference line 220, and as having a transition from the right wing segment 211 to the center segment 210 at a reference line 221. Within the reference lines 220, 221, the leading edge 210a and the trailing edge 210b of the center segment 210 are substantially parallel.

The thrust units 116, 114, 118 may be electrically powered fan units with an internal fan. In some aspects, each of the electrically powered fan units may be powered by a plurality of fuel cells. As seen in cross-section in FIG. 12, an exemplary fan tube 400 has an inlet 405 which allow for an inlet air flow 406. Within the fan tube 400 is a fan 402. The fan 402 may have an electric motor and be electrically coupled to a aircraft power system which is turn coupled to one or more fuel cells. Downstream from the fan 402 may be one or more air system inlets 407 which are adapted to route air to the series of compressors used to compress the air prior to delivery to the fuel cell, and which are also adapted to route air to other various cooling pathways as described above. Also in the fan tube 400 may be exhaust ducts 404 which route the fuel cell exhaust and the inletted air which has been routed through cooling pathways back into the air tube 400 prior to the nozzle area 410, which is then joined with the other thrusted air from the fan 402 into the exit flow 370.

In some aspects, as seen in FIG. 13, a more complex air tube configuration may also include heat exchangers 360 downstream from the fan 402. A water spray unit 350 may be placed upstream from the heat exchangers 360 to introduce water from the water reservoir into the air flow to enhance cooling. Although illustrated in FIG. 13 for a fan tube, it is understood that in the thermodynamic system of the VTOL aircraft, as described above, a similar configuration of an intake fan, a water spray unit, and a downstream heat exchanger will be used even when this portion of the system is not a primary thrust producing aspect of the aircraft, as discussed above. FIG. 14 illustrates an embodiment where the heat exchanger 405 is upstream from the fan 402.

Figure 15:
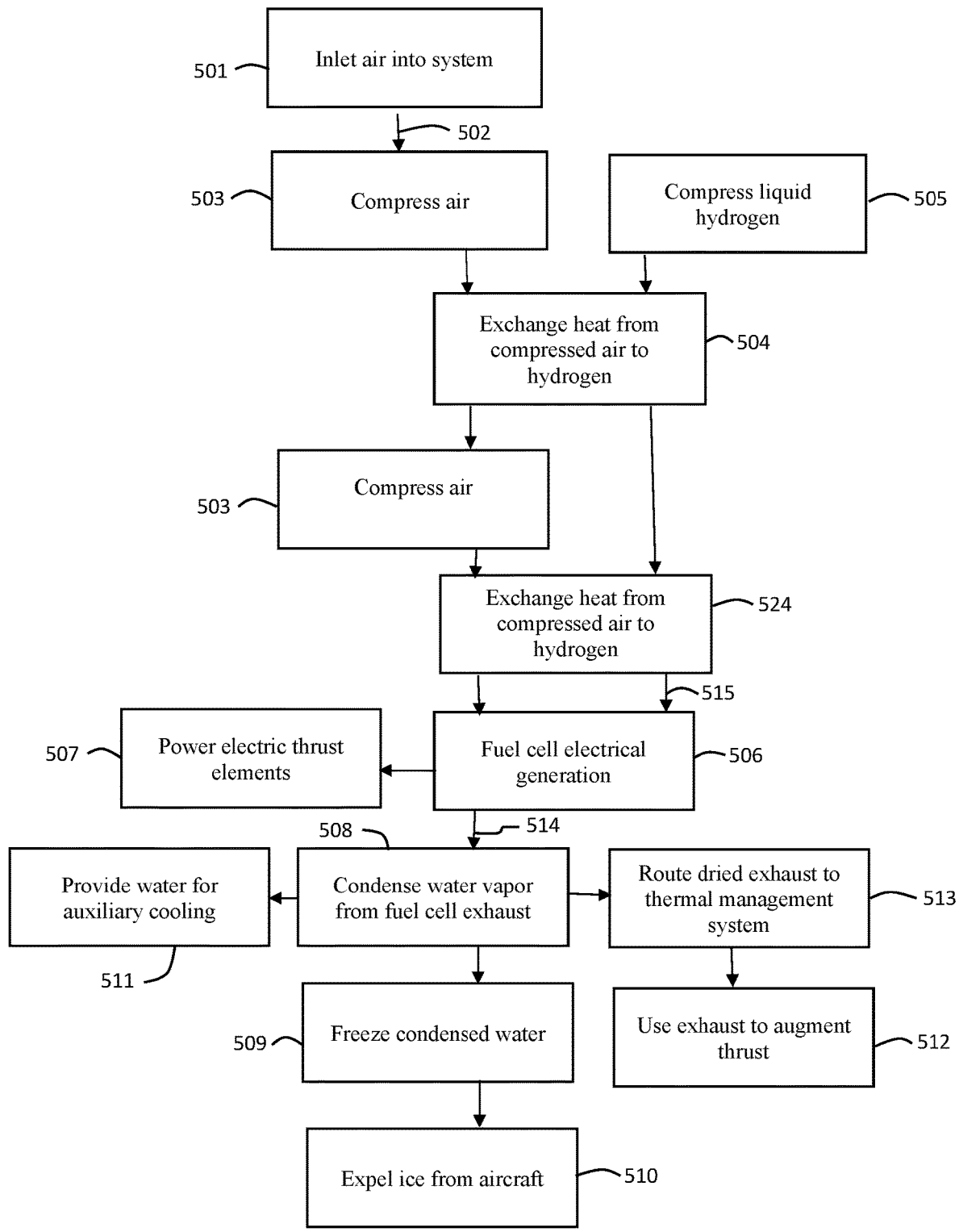
FIG. 15 illustrates method of using a high efficiency hydrogen fuel cell system according to some embodiments of the present invention.

In some aspects of methods according to the present invention, and as seen in FIG. 15, a method of providing a high efficiency hydrogen fueled high altitude thermodynamic fuel cell system powered aircraft comprising the steps of inletting air 501, routing the inletted air through an inlet air fan 502, further routing the inletted air to a series of one or more compressors and also to routing some of the inletted air to a plurality of thermal system pathways 504, 524, compressing the inletted air in one or more compressors 503, routing the compressed air to a fuel cell 514, routing liquid hydrogen from a liquid hydrogen tank to a liquid hydrogen compressor 505, heating the hydrogen with the compressed air at an intercooler 504, expanding the hydrogen 515, routing the expanded hydrogen to a fuel cell, generating electricity at the fuel cell 506, powering electric thrust elements with the generated electricity 507, routing the exhaust 514 through one or more intercoolers to condense the water in the fuel cell exhaust 508, routing some or all of the condensed water to an ice maker 509, and expelling the ice from the aircraft 510.

In some aspects, a method of providing a high efficiency hydrogen fueled high altitude thermodynamic fuel cell system powered VTOL aircraft comprising the steps of inletting air, routing the inletted air through an inlet air fan, further routing the inletted air to a series of one or more compressors and also to routing some of the inletted air to a plurality of thermal system pathways, compressing the inletted air in one or more compressors, routing the compressed air to a fuel cell, routing liquid hydrogen from a liquid hydrogen tank to a liquid hydrogen compressor, heating the hydrogen with the compressed air at an intercooler, expanding the hydrogen, routing the expanded hydrogen to a fuel cell, providing electricity to a plurality of electrically powered VTOL rotor assemblies, and spraying water 511 into the inletted air upstream of a intercooler cooling a closed loop fuel cell thermal system.

In some aspects, a method of providing a high efficiency hydrogen fueled high altitude thermodynamic fuel cell system powered aircraft with fan tubes comprising the steps of inletting air into the fan tube, routing the inletted air through an air fan, further routing a portion of the inletted air to a series of one or more compressors and also to routing some of the inletted air to a plurality of thermal system pathways, compressing the inletted air in one or more compressors, routing the compressed air to a fuel cell, routing liquid hydrogen from a liquid hydrogen tank to a liquid hydrogen compressor, heating the hydrogen with the compressed air at an intercooler, expanding the hydrogen, routing the expanded hydrogen to a fuel cell, routing the exhaust through one or more intercoolers to condense the water in the fuel cell exhaust, the condensed water to a water reservoir, outletting the exhaust into the fan tube downstream of the air fan, and providing thrust to the aircraft from the fan tube. In some aspects, the method further comprises routing the air flow in the fan tube through heat exchanger that are part of the thermal system which are residing within the fan tube.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A high efficiency hydrogen fueled thermodynamic fuel cell system for a high altitude aircraft, said system comprising:
   an air inlet;
   a fan downstream from air inlet;
   a first air compressor fluidically coupled to said air inlet downstream from said fan, said first compressor adapted to compress inletted air into a fuel cell air pathway;
   a second air compressor fluidically coupled to said first air compressor downstream from said first air compressor;
   a third air compressor fluidically coupled to said second air compressor downstream from said second air compressor;
   a liquid hydrogen reservoir;
   a liquid hydrogen pump coupled to said liquid hydrogen reservoir, said pump adapted to pressurize liquid hydrogen through a hydrogen pathway;
   a first heat exchanger adapted to cool air downstream of said first air compressor with inletted air downstream from said fan;
   a second heat exchanger adapted to cool air downstream of said first compressor with hydrogen from said pump;
   a third heat exchanger adapted to cool air downstream of said second air compressor with inletted air downstream from said fan;
   a fourth heat exchanger adapted to cool air downstream of said second compressor with hydrogen from said pump downstream along said hydrogen pathway from said second heat exchanger;
   a hydrogen expander along said hydrogen pathway downstream from said fourth heat exchanger, and
   a fuel cell, said fuel cell fluidically coupled to said hydrogen pathway downstream of said hydrogen expander, said fuel cell fluidically coupled to said fuel cell air pathway downstream of said third compressor.

2. The high efficiency hydrogen fueled thermodynamic fuel cell system for a high altitude aircraft of claim 1 further comprising:
   a closed loop cooling system adapted to cool said fuel cell, said closed loop cooling system comprising a cooling fluid and a pump; and
   an eighth heat exchanger thermally coupled to said cooling fluid and with inletted air downstream for said fan.

3. The high efficiency hydrogen fueled thermodynamic fuel cell system for a high altitude aircraft of claim 2 further comprising:
   a sixth heat exchanger thermally coupled to an exhaust conduit routing exhaust from said fuel cell;
   a seventh heat exchanger thermally coupled to said exhaust conduit downstream from said sixth heat exchanger; and
   a water separator coupled to said exhaust conduit downstream from seventh heat exchanger.

4. The high efficiency hydrogen fueled thermodynamic fuel cell system for a high altitude aircraft of claim 3 further comprising:
   a water reservoir fluidically coupled to said water separator via a water pathway;
   a water pump fluidically coupled to said water reservoir; and
   a water sprayer adapted to spray water into the inletted air downstream of said fan and upstream of said eighth heat exchanger.

5. The high efficiency hydrogen fueled thermodynamic fuel cell system for a high altitude aircraft of claim 4 further comprising:
   a burner, said burner fluidically coupled to said hydrogen pathway downstream from said hydrogen expander, said burner fluidically coupled to said fuel cell air pathway downstream from said third compressor.

6. The high efficiency hydrogen fueled thermodynamic fuel cell system for a high altitude aircraft of claim 5 wherein the heated output of said burner is routed to a fifth heat exchanger which heats dried fuel cell exhaust from the water separator.

7. The high efficiency hydrogen fueled thermodynamic fuel cell system for a high altitude aircraft of claim 6 wherein the heated dried fuel cell exhaust from said fifth heat exchanger is routed to a third turbo charger adapted to power said third compressor.

8. The high efficiency hydrogen fueled thermodynamic fuel cell system for a high altitude aircraft of claim 7 wherein the heated dried fuel cell exhaust from said third turbocharger is routed to a second turbo charger adapted to power said second compressor.

9. The high efficiency hydrogen fueled thermodynamic fuel cell system for a high altitude aircraft of claim 8 wherein the heated dried fuel cell exhaust from said second turbo charger is routed to a first turbo charger adapted to power said first compressor.

10. The high efficiency hydrogen fueled thermodynamic fuel cell system for a high altitude aircraft of claim 9 further comprising:
- a first electric motor mechanically coupled to said first compressor;
- a second electric motor mechanically coupled to said second compressor; and
- a third electric motor mechanically coupled to said third compressor.

11. A vertical take-off and landing aircraft comprising:
a main vehicle body;
a right side wing, said right side wing coupled a right side of said main vehicle body;
one or more right side rotor assemblies, said one or more right side rotor assemblies comprising a propeller and a motor, wherein said one or more right side wing rotors are attached to said right side wing;
a right side wingtip rotor assembly, said right side wingtip rotor assembly comprising a propeller and a motor, where said right side wingtip rotor assembly is attached to the outboard tip of said right side wing;
a left side wing, said left side wing coupled a left side of said main vehicle body;
one or more left side rotor assemblies, said one or more left side rotor assemblies comprising a propeller and a motor, wherein said one or more left side wing rotors are attached to said left side wing;
a left side wingtip rotor assembly, said left side wingtip rotor assembly comprising a propeller and a motor, where said left side wingtip rotor assembly is attached to the outboard tip of said left side wing, wherein said right side rotor assemblies, said right side wingtip rotor assembly, said left side rotor assemblies, and said left side wingtip rotor assembly are attached by a deployment mechanism adapted to deploy said assemblies from a forward facing horizontal flight configuration to a vertical take-off configuration; and
high efficiency hydrogen fueled thermodynamic fuel cell system, said thermodynamic fuel cell system comprising:
an air inlet;
a fan downstream from air inlet;
a first air compressor fluidically coupled to said air inlet downstream from said fan, said first compressor adapted to compress inletted air into a fuel cell air pathway;
a second air compressor fluidically coupled to said first air compressor downstream from said first air compressor;
a third air compressor fluidically coupled to said second air compressor downstream from said second air compressor;
a liquid hydrogen reservoir;
a liquid hydrogen pump coupled to said liquid hydrogen reservoir, said pump adapted to pressurize liquid hydrogen through a hydrogen pathway;
a first heat exchanger adapted to cool air downstream of said first air compressor with inletted air downstream from said fan;
a second heat exchanger adapted to cool air downstream of said first compressor with hydrogen from said pump;
a third heat exchanger adapted to cool air downstream of said second air compressor with inletted air downstream from said fan;
a fourth heat exchanger adapted to cool air downstream of said second compressor with hydrogen from said pump downstream along said hydrogen pathway from said second heat exchanger;
a hydrogen expander along said hydrogen pathway downstream from said fourth heat exchanger, and
a fuel cell, said fuel cell fluidically coupled to said hydrogen pathway downstream of said hydrogen expander, said fuel cell fluidically coupled to said fuel cell air pathway downstream of said third compressor.

12. The vertical take-off and landing aircraft of claim 1 wherein high efficiency hydrogen fueled thermodynamic fuel cell system further comprises:
- a closed loop cooling system adapted to cool said fuel cell, said closed loop cooling system comprising a cooling fluid and a pump; and
- an eighth heat exchanger thermally coupled to said cooling fluid and with inletted air downstream for said fan.

13. The vertical take-off and landing aircraft of claim 12 wherein said high efficiency hydrogen fueled thermodynamic fuel cell system further comprises:
- a sixth heat exchanger thermally coupled to an exhaust conduit routing exhaust from said fuel cell;
- a seventh heat exchanger thermally coupled to said exhaust conduit downstream from said sixth heat exchanger; and
- a water separator coupled to said exhaust conduit downstream from seventh heat exchanger.

14. The vertical take-off and landing aircraft of claim 13 wherein said high efficiency hydrogen fueled thermodynamic fuel cell system further comprises:
- a water reservoir fluidically coupled to said water separator via a water pathway;
- a water pump fluidically coupled to said water reservoir; and
- a water sprayer adapted to spray water into the inletted air downstream of said fan and upstream of said eighth heat exchanger.

15. A method of powering a high efficiency hydrogen fueled high altitude thermodynamic fuel cell system powered aircraft, said method comprising the steps of:
inletting air from outside the aircraft through an air inlet;
routing a first portion of the inletted air to an inlet leading to a series of one or more compressors;
routing a second portion of the inletted air to a plurality of thermal system pathways;
compressing the first portion of the inletted air in one or more compressors;
routing the compressed air to a fuel cell;
routing liquid hydrogen from a liquid hydrogen tank to a liquid hydrogen compressor;
heating the hydrogen with the compressed air at an intercooler;
expanding the hydrogen in one or more expanders;
routing the expanded hydrogen to a fuel cell; and
providing electricity from the fuel cell to a plurality of electric motors powering the aircraft.

16. The method of claim 15 further comprising the step of spraying water into the inletted air downstream of the inlet fan and upstream of an intercooler cooling a closed loop fuel cell thermal system.

17. The method claim 15 further comprising the steps of:
condensing water out of the fuel cell exhaust;
freezing the water condensed out of the fuel cell exhaust; and
expelling the frozen water from the aircraft.

18. The method claim 16 further comprising the steps of:
condensing water out of the fuel cell exhaust;
freezing the water condensed out of the fuel cell exhaust; and
expelling the frozen water from the aircraft.

19. The method of claim 15 further comprising the steps of:
    condensing water out of the fuel cell exhaust; and
    storing the condensed water in a water tank.

20. The method of claim 15 further comprising the step of spraying water from the water tank into the inletted air downstream of the inlet fan and upstream of an intercooler cooling a closed loop fuel cell thermal system.

* * * * *